United States Patent
Waanders et al.

(10) Patent No.: US 8,783,503 B2
(45) Date of Patent: Jul. 22, 2014

(54) PACKAGED FORMULATION COMPRISING A COMPOUND LIABLE TO EXOTHERMIC DECOMPOSITION

(75) Inventors: Petrus Paulus Waanders, Goor (NL); Johannes Harmannus Gerardus Lok, Gorssel (NL)

(73) Assignee: Akzo Nobel N.V., Arnhem (NL)

( * ) Notice: Subject to any disclaimer, the term of this patent is extended or adjusted under 35 U.S.C. 154(b) by 160 days.

(21) Appl. No.: 13/003,050

(22) PCT Filed: Jul. 3, 2009

(86) PCT No.: PCT/EP2009/058380
§ 371 (c)(1),
(2), (4) Date: Jan. 7, 2011

(87) PCT Pub. No.: WO2010/003887
PCT Pub. Date: Jan. 14, 2010

(65) Prior Publication Data
US 2011/0118421 A1 May 19, 2011

Related U.S. Application Data

(60) Provisional application No. 61/086,208, filed on Aug. 5, 2008.

(30) Foreign Application Priority Data

Jul. 7, 2008 (EP) .................................. 08159819

(51) Int. Cl.
*B65D 90/22* (2006.01)
*B65D 90/34* (2006.01)
*C08F 4/28* (2006.01)

(52) U.S. Cl.
CPC ................ *C08F 4/28* (2013.01); *Y10S 220/913* (2013.01)
USPC ........ 220/560.1; 220/913; 525/387; 526/227; 252/186.42; 252/186.1; 252/186.2; 252/186.25; 252/186.43; 206/524.1; 206/524.4

(58) Field of Classification Search
USPC ........... 525/387; 526/227; 220/560.01, 366.1, 220/367.1, 368, 373, 913; 252/186.42; 252/186.1, 186.2, 186.25, 186.43; 206/524.1, 524.4
See application file for complete search history.

(56) References Cited

U.S. PATENT DOCUMENTS

| 4,039,475 A | * | 8/1977 | Oosterwijk et al. | .......... 502/160 |
| 2004/0079754 A1 | * | 4/2004 | Schutz | ....................... 220/62.22 |
| 2004/0164081 A1 | | 8/2004 | Schutz | |
| 2007/0048469 A1 | * | 3/2007 | Schubbach et al. | .......... 428/35.7 |

FOREIGN PATENT DOCUMENTS

| WO | 02/051802 | * | 7/2002 |
| WO | WO 02 051802 A1 | | 7/2002 |
| WO | WO 2007/012595 A1 | | 2/2007 |
| WO | 2008/020000 | * | 2/2008 |
| WO | WO 2008 020000 A1 | | 2/2008 |

OTHER PUBLICATIONS

Crissman, Performance of Plastic Packaging for Hazardous Materials Transportation, Part I. Mechanical Properties, Report No. DOT/MTB/OHMO-76/4, Oct. 1976.*
Notice of Opposition filed Feb. 6, 2014 by Arkema France against commonly-owned European patent application No. 009793928.4.
English translation of Notice of Opposition filed Feb. 6, 2014 by Arkema France against commonly-owned European patent application No. 009793928.4.
ADR, appl from Jan. 1, 2007 European Agreement Concern. Int'l Carriage of Goods by Dangerous Rd, Vo 1 UN, NY & Geneva, 2006. Doc avail www.unece.orgltrans/danger/publi/adr/adr2007.
Product Safety Summary, "Peracetic Acid", Case No. 79-21-0 SOLVAY, Published 2012.
Material Safety Data Sheet for LUPEROX® 26, Arkema, Published 2009.
Material Safety Data Sheet for LUPEROX® 10, Arkema in French, Published 2013.
Material Safety Data Sheet for AZDN, Arkema, Published 2011.
Material Safety Data Sheet for LUPEROX DCP®, Arkema, Published 2013.
Expert translation of machine translation of Notice of Opposition filed Feb. 6, 2014 by Arkema France against commonly-owned European patent application No. 009793928.4.

* cited by examiner

*Primary Examiner* — Robert C Boyle
(74) *Attorney, Agent, or Firm* — Timothy D. Meade

(57) ABSTRACT

Packaged formulation comprising a compound liable to exothermic decomposition and optionally one or more organic diluents, said formulation being packaged in a container with a volume of at least 250 liter provided with a vent to release gases and made from a thermoplastic material having a Vicat B softening temperature not higher than (a) the run-away temperature of the compound liable to exothermic decomposition if the formulation does not contain any diluent, or (b) the boiling temperature of at least 50 wt % of the total weight of diluent if the formulation does contain organic diluent.

18 Claims, No Drawings

PACKAGED FORMULATION COMPRISING A COMPOUND LIABLE TO EXOTHERMIC DECOMPOSITION

REFERENCE TO RELATED APPLICATION(S)

This application is the U.S. National Phase of PCT/EP2009/058380 filed on Jul. 3, 2009 and claims the benefit of U.S. Provisional Application No. 61/086,208 filed on Aug. 5, 2008.

The present invention relates to (i) a packaged formulation comprising a compound liable to exothermic decomposition, (ii) the storage and/or transport of said formulation, and (iii) methods for producing and modifying polymers using said packaged formulation.

Compounds liable to exothermic decomposition, such as organic peroxides, can decompose above a certain critical temperature to produce gas and heat. The heat produced promotes further decomposition. The storage and transportation of these compounds is particularly troublesome in that the build-up of decomposition gases in the transportation or storage container may cause violent, hazardous explosions, fragmenting the container holding the peroxide. In recognition of this problem, international safety laws and standards regulate the transportation and storage of these compounds.

The larger the container, the lower its surface-to-volume ratio, and the more difficult the transmittal of heat to the surroundings in case of thermal decomposition. Hence, storage and transport of peroxides and other compounds liable to exothermic decomposition becomes more hazardous when the container volume increases.

In order to improve transportation and storage safety, organic peroxides are generally stored and transported in containers containing the peroxide diluted with one or more liquids, e.g. in the form of a suspension, emulsion, or solution. Aqueous peroxide emulsions or suspensions are generally considered safe formulations, because the peroxide is dispersed in the water phase, which is well suited for the removal of the heat of decomposing peroxide molecules, e.g. by convection and/or evaporation. Peroxide formulations containing organic diluents, however, are regarded far more dangerous.

Containers for the storage and/or transport of large volumes of non-aqueous peroxide mixtures are generally made of steel that can withstand the pressures exerted upon explosion. Conventional plastic tanks have not been regarded suitable for such mixtures because of their easy fragmentation.

Surprisingly, it has now been found that large volume plastic containers can be used for safe storage and transport of non-aqueous peroxide mixtures, as long as the container has a vent to release gases and is made of a thermoplastic material having a Vicat B softening temperature not higher than the boiling temperature of the diluent or, in case no diluent is present, the run-away temperature of the organic peroxide.

It has been found that in such containers, if the temperature within the container rises due to exothermic decomposition, (parts of) the walls of the container can soften and decrease in strength before the build-up of gases becomes dangerously high. This softening will result in the container to collapse and/or one or more container walls to tear, thereby releasing gas and/or liquid in a gentle way, without fragmentation or explosive rupture of the container.

The present invention therefore relates to a packaged formulation comprising a compound liable to exothermic decomposition and optionally one or more organic diluents, said formulation being packaged in a container with a volume of at least 250 liter provided with a vent to release gases and made from a thermoplastic material having a Vicat B softening temperature not higher than (a) the run-away temperature of the compound liable to exothermic decomposition if the formulation does not contain any diluent, or (b) the boiling temperature of at least 50 wt % of the total weight of diluent if the formulation does contain organic diluent.

So, this invention covers two main embodiments. In the first main embodiment, the formulation contains at least one compound liable to exothermic decomposition and no diluent. That is: no organic diluent but also no aqueous diluent, wherein "no diluent" is defined as less than 1 wt %, preferably less than 0.5 wt % of diluent. In this embodiment, it is essential that the Vicat B softening temperature of the thermoplastic material is not higher than the run-away temperature of the compound liable to exothermic decomposition. This run-away temperature is defined as the Self Accelerating Decomposition Temperature (SADT) plus 40° C. The SADT is the lowest temperature at which self-accelerating decomposition may occur with a packaged substance and is measured according to UN test H.4. In practice, the run-away does not start before the temperature is more than 40° C. above the SADT. That is why in this specification the run-away temperature is defined as SADT+40° C.

The Vicat B softening temperature of the thermoplastic material is preferably at least 0° C., more preferably at least 10° C., even more preferably at least 20° C., and most preferably at least 30° C. below the run-away temperature of the compound liable to exothermic decomposition.

In the second main embodiment, the formulation contains an organic diluent. In this embodiment, the Vicat B softening temperature of the thermoplastic material is not higher than the boiling temperature of at least 50 wt % of the total weight of diluent.

If a pure diluent is used, the boiling temperature is defined as the boiling point of this diluent at normal pressure.

If the diluent consist of a mixture of liquid compounds having a boiling range at normal pressure, the boiling temperature is defined as the lowest limit of the boiling range of said mixture at normal pressure.

If the diluent consist of an azeotropic mixture of liquid compounds, the boiling temperature is defined as the boiling point of the azeotrope at normal pressure.

If the mixture of liquid compounds forming the diluent has individual boiling points or boiling ranges at normal pressure, this mixture has more than one boiling temperature. In that case, at least 50 wt %, preferably at least 60 wt %, more preferably at least 70 wt %, even more preferably at least 80 wt %, and most preferably at least 90 wt % of the total weight of diluent present in the formulation must have a boiling temperature at least equal, but preferably higher than the Vicat B softening temperature of the thermoplastic material.

The temperature difference between the softening temperature of the thermoplastic material and the boiling temperature of the diluent—in case of a mixture of diluents with more than one boiling temperature: the lowest boiling temperature above the softening temperature—is at least 0° C., preferably at least 5° C., more preferably 10-400° C., and most preferably 50-300° C.

The Vicat B softening temperature is measured in accordance with ASTM D1525-00.

Preferably, the walls of the container have an average thickness in the range 0.5-5.0 mm, more preferably 0.5-3.5 mm, and most preferably 0.5-2.5 mm. Such relatively thin walls allow relatively quick softening of the walls when the temperature of the formulation rises above the softening temperature.

The bursting pressure of the container is preferably between 0.5 and 4.0 bar, more preferably between 0.5 and 3.0 bar, and most preferably between 0.5 and 2.0 bar. This bursting pressure is determined by filling the container with water and raising the water pressure until the container bursts.

Examples of thermoplastic materials that—depending on the boiling temperature of the diluent and the run-away temperature of the compound liable to exothermic decomposition—might be suitable for constituting the container, are High Density Polyethylene (HDPE; Vicat B softening temperature: approx. 70° C.), Polypropylene (PP; Vicat B softening temperature: approx. 90° C.), Poly Vinyl Chloride (PVC; Vicat B softening temperature: approx. 85° C.); Low Density Polyethylene (LDPE; Vicat B softening temperature: approx. 55° C.); Linear Low Density Polyethylene (LLDPE; Vicat B softening temperature: approx. 75° C.); Styrene Acrylonitril (SAN; Vicat B softening temperature: approx. 100° C.); Acrylonitril Butadiene Styrene (ABS; Vicat B softening temperature: approx. 100° C.); Poly Methyl Methacrylate (PMMA; Vicat B softening temperature: approx. 100° C.); Poly Styrene (PS; Vicat B softening temperature: approx. 95° C.). Acrylonitril Styrene Acrylate (ASA; Vicat B softening temperature: approx. 95° C.); Thermoplastic Starch Polymer (TPS; Vicat B softening temperature: approx. 85° C.); Cellulose Acetate Butyrate (CAB; Vicat B softening temperature: approx. 65° C.); Cellulose Acetate (CA; Vicat B softening temperature: approx. 70° C.); Polybutadiene (PB; Vicat B softening temperature: approx. 85° C.). The thermoplastic material may also consist of a co- or terpolymer of two or more of the above-mentioned thermoplastic materials.

The preferred thermoplastic material is HDPE.

Examples of organic diluents that, depending on the thermoplastic material, might be suitable for use in the formulation are aliphatic hydrocarbons, aromatic hydrocarbons, and oxygenated hydrocarbons, such as ethers, epoxides, and esters.

Examples of preferred diluents are isododecane (boiling range: 175-195° C.), mineral oils (generally boil above 200° C.), n-paraffinic oils (generally boil above 110° C.), odorless mineral spirit (generally boil above 110° C.), iso-parafinnic oils (generally boil above 110° C.), white oils (generally boil above 200° C.), toluene (generally boiling point: 110° C.), ethyl benzene (boiling point: 136° C.), xylene (boiling range: 138-144° C.), isopropyl benzene (boiling range: 152-154° C.) diisopropyl benzene (boiling range: 203-210° C.), kerosene (boiling range: 175-325° C.), diesel fuel, pthalates (generally boil above 230° C.) and adipates (generally boil above 230° C.), ethers with a boiling point above 110° C., epoxides, such as epoxidised soybean oil (boils above 200° C.), alcohols with a boiling point above 110° C., glycols (generally boil above 110° C.), and ketones or aldehydes with a boiling point above 110° C. The diluent may also be a mixture of any two or more of above mentioned compounds.

The most preferred organic diluents are isododecane and mineral oil.

The organic diluent either dissolves the compound liable to exothermic decomposition (in case the compound is solid) or dilutes said compound to form a homogeneous liquid (in case the compound is liquid). Alternatively, the organic diluent and the liquid compound liable to exothermic decomposition form, together with water as additional diluent, an emulsion.

The diluent is also known as phlegmatiser.

Suitable combinations of thermoplastic material and organic diluent are HDPE and isododecane, and HDPE and mineral oil.

Examples of compounds liable to exothermic decomposition are organic peroxides and azo-initiators.

Examples of azo-initiators are 2,2'-azodi(isobutyronitrile), 2,2'-azodi(2-methylbutyronitrile, and 1,1'-azobis(1-cylcohexanenitrile).

The compound liable to exothermic decomposition is preferably an organic peroxide.

Any organic peroxide can be used in the second Main Embodiment—i.e. in formulations containing organic diluent—including hydroperoxides, ketone peroxides, peroxyacids, dialkylperoxides, trioxepans, peroxyesters, peroxycarbonates, diacylperoxides, peroxydicarbonates, peroxyketals, cyclic ketone peroxides, mixed peroxides (containing two different peroxygen-bearing moieties in one molecule), and mixtures of two or more of these peroxides.

Although the organic peroxide can be oligomeric or polymeric in nature, it is preferred that they comprise one, two or three peroxygen bonds per molecule. Examples of peroxides that can be present in the packaged formulation according to the second Main Embodiment are:

(di)peroxyesters such as 1,1,4,4-tetramethylbutyl-1,4-di(peroxy-2-methylpropanoate), tert-butyl peroxyneodecanoate, tert-amyl peroxyneodecanoate, 1,1,3,3-tetramethylbutyl peroxyneodecanoate, 1,1-dimethyl-3-hydroxybutyl-1-peroxyneodecanoate, cumyl peroxyneodecanoate, tert-butylperoxy neoheptanoate, tert-amylperoxy neoheptanoate, 1,1,3,3-tetramethyl butyl-1-peroxy neoheptanoate, 1,1-dimethyl-3-hydroxy butyl-1-peroxy neoheptanoate, tert-butylperoxy diethylacetate, tert-amylperoxy diethylacetate, 1,1,3,3-tetramethyl butyl-1-peroxy diethylacetate, 1,1-dimethyl-3-hydroxy butyl-1-peroxy diethylacetate, cumyl peroxyneoheptanoate, tert-butylperoxy pivalate, tert-amylperoxy pivalate, 1,1,3,3-tetramethyl butyl-1-peroxy pivalate, 1,1-dimethyl-3-hydroxy butyl-1-peroxy pivalate, tert-butylperoxy 2-ethylhexanoate, tertamyl peroxy 2-ethylhexanaoate, 1,1,3,3-tetramethylbutyl-1-peroxy 2-ethylhexanoate, 1,1-dimethyl-3-hydroxy butyl-1-peroxy 2-ethylhexanoate, tert-butylperoxy benzoate, tert-amylperoxy benzoate, 1,1,3,3-tetramethylbutyl-1-peroxy benzoate, 1,1-dimethyl-3-hydroxy butyl-1-peroxy benzoate, tert-butylperoxy 3,3,5-trimethylhexanoate, tert-amylperoxy 3,3,5-trimethylhexanoate, 1,1,3,3-tetramethylbutyl-1-peroxy 3,3,5-trimethylhexanoate, 1,1-dimethyl-3-hydroxy butyl-1-peroxy 3,3,5-trimethylhexanoate, tert-butylperoxy acetate, tert-amylperoxy acetate, 1,1,3,3-tetramethylbutyl-1-peroxy acetate, 1,1-dimethyl-3-hydroxy butyl-1-peroxy acetate, tert-butylperoxy isobutyrate, tert-amylperoxy isobutyrate, 1,1,3,3-tetramethylbutyl-1-peroxy isobutyrate, 1,1-dimethyl-3-hydroxy butyl-1-peroxy isobutyrate, and 1,4-di-(tert-butylperoxycarbo) cyclohexane, dialkylperoxides, such as di-tert-butyl peroxide, di-tert-amyl peroxide, tert-butyl tert-amyl peroxide, di(tert-butylperoxy-isopropyl) benzene, 2,5-dimethyl-2,5-di(tert-butylperoxy)hexane, tert-butyl cumyl hydroperoxide, 2,5-dimethyl-2,5-di(tert-butylperoxy)hexyne-3, dicumyl peroxide, and tert-butyl 3-isopropenylcumyl peroxide, diacylperoxides, such as diisobutyryl peroxide, di(3,5,5-trimethylhexanoyl) peroxide, dilauroyl peroxide, dioctanoyl peroxide, didecanoyl peroxide, dibenzoyl peroxide, di(4-methylbenzoyl) peroxide, and di(2,4-dichlorobenzoyl) peroxide, peroxydicarbonates, such as di(3-methoxybutyl) peroxydicarbonate, diisopropyl peroxydicarbonate, di-sec-butyl peroxydicarbonate, di(4-tert-butylcyclohexyl) peroxydicarbonate, di(2-ethylhexyl) peroxydicarbonate, dicetyl peroxydicarbonate, and dimyristyl peroxydicarbonate, peroxycarbonates, such as tert-butylperoxy isopropylcarbonate, tert-butylperoxy 2-ethylhexyl carbonate, tert-amylperoxy 2-ethylhexyl carbonate, and tert-butylperoxy stearyl carbonate, hydroperoxides, such as isopropylcumyl hydroperoxide, 1,1,3,3-tetramethylbutyl hydroperoxide, cumyl hydroperoxide, and tert-amyl hydroperoxide, peroxyketals, such as 1,1-di(tert-butylperoxy)-3,3,5-trimethylcyclohexane, 1,1-di(tert-amylperoxy)-3,3,5-trimethylcyclohexane, 1,1-di(tert-amylperoxy)cyclohexane, 1,1-di(tert-butylperoxy)cyclohexane, 2,2-di(tert-butylperoxy)butane, 2,2-di(tert-amylperoxy)butane, butyl 4,4-di(tert-butylperoxy)valerate, and 2,2'-bis(4,4-di-(tert-butyl-peroxy-cyclohexyl) propane), cyclic peroxides, such as 3,6,9,-triethyl-3,6,9-trimethyl-1,4,7-triperoxonane and 3,3,5,7,7-pentamethyl-1,2,4-trioxepane, ketone peroxides, such as methyl ethyl ketone peroxide, 2,4 pentanedione peroxide, methyl isobutyl ketone peroxide, cyclohexanone peroxide, acetylacetone peroxide, and di(1-hydroxycyclohexyl) peroxide.

Examples of peroxides that can be present in the packaged formulation according to the first Main Embodiment, i.e. in formulations containing no diluent, are di-tert-amyl peroxide, tert-butyl cumyl hydroperoxide, and di-tert-butyl peroxide.

The packaged formulation according to the present invention preferably contains the compound liable to exothermic decomposition in an amount of 10 to 100 wt %, more preferably 10 to 95 wt %, even more preferably 20 to 80 wt %, and most preferably 30 to 70 wt %. The organic diluent is preferably present in an amount of 0 to 90 wt %, more preferably 5 to 90 wt %, even more 20 to 80 wt %, and most preferably 30 to 70 wt %.

If so desired, the formulation may further contain other ingredients, such suspending or emulsifying agents, e.g polyvinylalcohol. It should be noted that the formulation may also contain water in addition to organic diluent and compound liable to exothermic decomposition—thereby forming an emulsion—but the formulation is preferably non-aqueous.

The container has a volume of at least 250 liters, preferably at least 600 liters, more preferably at least 800 liters, and most preferably at least about 1,000 liters. The container volume preferably is not more than 20,000 liters, more preferably not more than 10,000 liters.

The container must have a vent to release gases formed in the container. The required size of this opening (the vent area) depends on, e.g., the volume of the container and the type and concentration of the compound liable to exothermic decomposition that is present in the container. This vent can have the form of a membrane, a breather, a pressure release valve, or any other form that allows release of gases form the container.

In a preferred embodiment, the container is constructed as disclosed in WO 2008/020000; that is: it has a spout opening, a neck along the periphery of the spout opening, and a venting cover comprising a body plate to cover the spout opening, the body plate having a vent opening and having arranged along its periphery a flange with an inner peripheral surface provided with fastening means to cooperate with corresponding fastening means on the outer face of the neck, wherein the vent opening is covered by a gas permeable filter, characterized in that the gas permeable filter is a sheet fixed between the fastening means of the neck and the flange.

This sheet can for example be a foil of a plastic material. The thickness of the sheet can be for instance between about 5 micrometers and about 0.5 mm, e.g. between about 10 micrometers and about 0.1 mm. To make the sheet permeable for gas, the sheet can be perforated. The pore diameter of the perforations can for instance be between about 10 micrometers and about 2 mm, e.g., between about 0.1 mm and about 1.5 mm.

The venting cover can for example be a screw cap. To this end, the aforementioned fastening means can be formed by an outer screw thread on the outer face of the neck of the spout opening and a corresponding inner screw thread on the venting cover flange.

Optionally, the vent opening in the venting cover is provided with a pop-off cap. To this end, the vent opening can be surrounded by a neck closely fitting into a peripheral flange of the pop-off cap, wherein the mutually facing sides of the neck and the flange are profiled to form a releasable snap joint. This profiling can include mutually cooperating beads and recesses as commonly used in the field of snap joint technology. This allows dimensioning of the snap joint in such a way that it will pop off at a certain pre-determined overpressure, e.g., a pressure in the range of 0.1-0.5 bar or higher, by selecting a material with suitable flexibility and optimizing the dimensions of the beads and the recesses. The vent cover can for example have a diameter of 10-30 cm, e.g., about 15 cm. The pop-off cap can for example have a diameter of about 5-12 cm, e.g. about 7 cm. However, other dimensions for the venting cover and/or the pop-off cap, if present, may also be used, if so desired.

The invention further relates to a method for producing a polymer by means of a radical polymerisation process using organic peroxide as a source of free radicals, which method involves transporting a packaged peroxide formulation according to the invention to a polymerisation unit and introducing the peroxide formulation into the polymerisation process. Examples of such polymerisation processes are processes to make polyvinyl chloride, copolymers of vinyl chloride, poly(meth)acrylate (co)polymers, etc. Preferably, the process is a styrene suspension (co)polymerisation process or a high-pressure ethylene (co)polymerisation process. Comonomers that may be used in the (co)polymerisation process of ethylene are of the conventional type and include alkenes, such as propene, (cyclo)hexene and (cyclo)octene, and vinyl acetate.

Comonomers that may be used in the (co)polymerisation process of styrene are of the conventional type and include divinyl benzene. The amount of peroxide used in these conventional (co)polymerisation processes will vary, depending on the polymerisation temperature, the capacity for removing the heat of polymerisation, the kind(s) of monomer(s) used, and the applied pressure. Usually, from 0.001-25 wt % of peroxide, based on the total weight of the monomers, is employed. Preferably, from 0.001-15 wt % of peroxide is employed.

The invention also relates to a process for modifying a (co)polymer—such as in cross-linking, grafting, and controlled degradation processes, e.g. the formation of polypropylene with another molecular weight and/or molecular weight distribution—by transporting a packaged peroxide formulation according to the invention to a polymer modification unit and introducing the peroxide formulation into the process.

EXAMPLES

Example 1

An intermediate bulk container (IBC) having a volume of 1000 liter, an average wall thickness of about 2 mm, and a bursting pressure of about 1.3 bar, provided with an emergency vent opening with a diameter of 5.3 cm, made of HDPE (Vicat B softening temperature: approx. 70° C.), and positioned in a metal frame was filled with 900 liters of 40 wt % t-butyl peroxypivalate (TBPP) in isododecane. For the simulation of self accelerating decomposition, a low heating rate (i.e. 0.12° C./min) was applied. The test was performed in a Total Containment Tank under nitrogen atmosphere. Approximately 4 h 45' after start, the IBC started to bulge on top. After the temperature reached 55° C., the pressure in the IBC increased further and caused the cap covering the vent opening to pop-off slowly at approx. 0.1 barg. The double-layered plastic sheet beneath it ruptured at 0.4 barg. The temperature inside the container then rose quickly to approximately 180° C.; a lot of smoke and vapours were formed. The product deflagrated at a rate of approx. 6.2 mm/min.

It appeared that because of the high temperature the side-walls and top part of IBC were softened/melted and collapsed to bottom; no rupture was observed. The metal frame was intact after the test; it was only slightly bulged at the top.

Example 2

Example 1 was repeated, except that the IBC was filled with 900 liters of 50 wt % di-(3,5,5-trimethyl hexanoyl) peroxide (DTMHP) in isododecane.

The packaged formulation was heated with a rate of 0.14° C./min. Approximately 4 h 46' after start, the IBC started to slightly bulge at the top. After the temperature inside the container reached 76° C., the pressure in the IBC increased further and caused the cap covering the vent opening to pop-off slowly at approx. 0.1 barg. The double-layered plastic sheet beneath it ruptured at 0.4 barg. The temperature rose quickly to approx. 188° C.; a lot of smoke and vapours were formed. The product deflagrated at a rate of approx. 41 mm/min.

It appeared that because of the high temperature the side-walls and top part of the IBC were softened/melted and collapsed to bottom; no rupture was observed. The metal frame was intact after the test; it was only slightly bulged at the top.

Example 3

Example 1 was repeated, except that the heating rate was 0.10° C./min and the peroxide formulation was circulated via a centrifugal pump. This test served to simulate a worse case scenario of homogeneous decomposition.

After start, the temperature rose gradually and after approx. 11 h the IBC started to slightly bulge at the top. After the temperature of the formulation reached 70° C., the pressure in the IBC increased further and caused the cap to pop-off slowly at approx. 0.1 barg. The double-layered plastic sheet ruptured at 0.2 barg. A vigorous flow of decomposition liquids and gases was observed through the vent for a period of approx. 1 minute; pump and heaters were switched-off. Further pressure rise was observed and the IBC tore open (at bottom-left) at P=0.93 barg. A homogeneous runaway resulted in a fast temperature rise to max. 180° C.; a lot of smoke and vapours were formed.

It appeared that because of high temperatures the side-walls and top part of the IBC were softened/melted and collapsed to bottom; no explosive rupture was observed. The metal frame was intact after the test, although slightly bulged on top and side-walls.

Example 4

Example 3 was repeated with 50 wt % of t-butylperoxy-2-ethylhexanoate (TBPEH) isododecane. A heating rate of 0.23° C./min was applied.

During the experiment, the temperature rose gradually, after ca. 3.5 h the pressure rose and the IBC started bulging. The cap popped-off slowly at approx. 0.1 barg; the pump was switched-off and the heat-exchanger was cooled with cold water.

The double-layered plastic sheet ruptured at 0.2 barg and a vigorous flow was observed through the vent opening. The pressure rose further and the IBC tore open at the top at P=0.84 barg. The lid was blown-off and a homogeneous runaway gave fast temperature rise to approximately 120° C.

It appeared that because of the high temperature, the side-walls and top of the IBC were melted to some extend; no explosive rupture was observed. The metal frame was intact after the test, although slightly bulged on top and side-walls.

From the above experiments, it can be concluded that these packaged formulations meet the UN criteria. Even under the worst case conditions of a homogenous thermal runaway of the most violent formulation tested (TBPP) no explosive rupture of the inner container and/or the metal frame occurred.

The invention claimed is:

1. A packaged non-aqueous formulation comprising a compound liable to exothermic decomposition and optionally one or more organic diluents, said formulation being packaged in a container with a volume of at least 250 liters provided with a vent to release gases and made from high density polyethylene (HDPE) having a Vicat B softening temperature not higher than (a) the run-away temperature of the compound liable to exothermic decomposition if the formulation does not contain any diluent, or (b) the boiling temperature of the diluents that constitute at least 50 wt % of the total weight of diluent if the formulation does contain organic diluent.

2. The packaged formulation according to claim 1 wherein the compound liable to exothermic decomposition is an organic peroxide.

3. The packaged formulation according to claim 1 containing the one or more organic diluents wherein at least 50 wt % of the total weight of diluent has a boiling temperature of at least 5° C. above the softening temperature of the thermoplastic material.

4. The packaged formulation according to claim 1 containing the one or more organic diluents wherein the organic diluent is selected from the group consisting of isododecane and mineral oil.

5. The packaged formulation according to claim 1 wherein the formulation is an emulsion comprising the compound liable to exothermic decomposition and one or more organic diluents.

6. The packaged formulation according to claim 1 wherein the walls of the container have an average thickness in the range 0.5-5 mm.

7. The packaged formulation according to claim 1 wherein the container has a bursting pressure in the range 0.5-2.0 bar.

8. The packaged formulation according to claim 1 wherein the container comprises has a spout opening, a neck along the periphery of the spout opening, and a venting cover comprising a body plate to cover the spout opening, the body plate having a vent opening and having arranged along its periphery a flange with an inner peripheral surface provided with fastening means to cooperate with corresponding fastening means on the outer face of the neck, wherein the vent opening is covered by a gas permeable filter, wherein the gas permeable filter is a sheet fixed between the fastening means of the neck and the flange.

9. The packaged formulation according to claim 2 containing the one or more organic diluents wherein at least 50 wt % of the total weight of diluent has a boiling temperature of at least 5° C. above the softening temperature of the thermoplastic material.

10. The packaged formulation according to claim 2 wherein the formulation is an emulsion comprising the compound liable to exothermic decomposition and one or more organic diluents.

11. The packaged formulation according to claim 3 wherein the formulation is an emulsion comprising the compound liable to exothermic decomposition one or more organic diluents.

12. The packaged formulation according to claim 5 wherein the walls of the container have an average thickness in the range 0.5-5 mm.

13. The packaged formulation according to claim 6 wherein the container has a bursting pressure in the range 0.5-2.0 bar.

14. The packaged formulation according to claim 6 wherein the container comprises a spout opening, a neck along the periphery of the spout opening, and a venting cover comprising a body plate to cover the spout opening, the body plate having a vent opening and having arranged along its periphery a flange with an inner peripheral surface provided with fastening means to cooperate with corresponding fastening means on the outer face of the neck, wherein the vent opening is covered by a gas permeable filter, wherein the gas permeable filter is a sheet fixed between the fastening means of the neck and the flange.

15. The packaged formulation according to claim 7 wherein the container comprises a spout opening, a neck along the periphery of the spout opening, and a venting cover comprising a body plate to cover the spout opening, the body plate having a vent opening and having arranged along its periphery a flange with an inner peripheral surface provided with fastening means to cooperate with corresponding fastening means on the outer face of the neck, wherein the vent opening is covered by a gas permeable filter, wherein the gas permeable filter is a sheet fixed between the fastening means of the neck and the flange.

16. A method for producing a polymer by means of a radical polymerisation process using organic peroxide as a source of free radicals, the method comprising transporting the packaged formulation according to claim 2 to a polymerisation unit and introducing the formulation into the polymerisation process.

17. A method for modifying a (co)polymer, the method comprising transporting the packaged formulation according to claim 2 to a polymer modification unit and introducing the formulation into the process.

18. A method to store and/or transport a formulation comprising a compound liable to exothermic decomposition and optionally one or more diluents, the method comprising storing and/or transporting said formulation in a container with a volume of at least 250 liters provided with a vent to release gases and made from a thermoplastic material having a Vicat B softening temperature not higher than (a) the run-away temperature of the compound liable to exothermic decomposition if the composition does not contain any diluent, or (b) the boiling temperature of at least 50 wt % of the total weight of diluent if the composition does contain organic diluent.

* * * * *